Patented May 27, 1952

2,598,644

UNITED STATES PATENT OFFICE 2,598,644

STYRENATED OIL, STYRENE OXIDE-PHENOL RESIN, DRYING OIL COATING COMPOSITION

Paul E. Marling, Dayton, Ohio, assignor to Monsanto Chemical Company, St. Louis, Mo., a corporation of Delaware No Drawing. Application September 29, 1948, Serial No. 51,859

3 Claims. (Cl. 260—23)

This invention relates to new improved coating compositions readily prepared from inexpensive and abundantly available raw materials. More particularly the invention relates to self-drying film forming compositions involving styrenated oils and resins prepared by the condensation of styrene oxide with phenols.

The paint and varnish industry has been seeking to adapt styrene to coating composition use because of its low cost and availability. Many of the developed coating compositions are too brittle for general utility, and others are only suitable for preparation of pigmented films because of the opacity resulting from the incompatibility of the styrenated oils with many commonly used resins and other coating composition components. It is also known that transparent drying oil substitutes can be prepared from styrene by interpolymerizing it with drying oils by specialized procedures. Compounds of this type are commercially available and are known to the industry as "styrenated oils." Although for many purposes the available styrenated oils are suitable, there are numerous formulations, particularly with phenolic resins in varnishes, where the incompatibility restricts their general utility.

The primary purpose of this invention is to provide new transparent coating compositions from styrene and related monomers. A further purpose is to provide a coating composition of unusual resistance to thermo softening and to the action of organic solvents, water, and alkali.

The expression "styrenated oils," as used in the protective coating industry and in this specification, means a copolymer of a natural drying oil and a styrene type of monomer, such as styrene, α-methylstyrene, vinylbiphenyl and isopropenylbiphenyl. Suitable natural oils are the drying oils or the semi-drying oils, including linseed oil, soy oil, tung oil and dehydrated castor oil. The copolymers are prepared by polymerization at elevated temperatures, preferably in the presence of peroxide catalysts, such as benzoyl peroxide, acetyl peroxide, t-butylhydroperoxide, isopropyl percarbonate and homologues thereof soluble in the mixed monomers or in the polymerization medium. The catalysts may be present to the extent of from 0.01 to five percent by weight, based on the combined monomers, but the preferred proportion of catalyst will depend upon the extent of polymerization required to bring the copolymer up to the desired viscosity at a pre-determined temperature. The proportion of the monomers and the original viscosity of the drying oil being used will also influence the quantity of catalyst required to attain the desired viscosity. Generally from 25 to 75 percent by weight, of vinyl or isopropenyl aromatic derivative, and 75 to 25 percent drying oil will produce a beneficial result. Optimum properties will be secured by using the preferred proportion of 40 to 60 percent of either component.

The styrenated oils may be prepared by refluxing the drying oil with an inert solvent or diluent, such as xylene, benzene, toluene, dioxane, or petroleum ether, in the presence of an organic peroxide, and adding the vinyl (or isopropenyl) aromatic hydrocarbon gradually until a predetermined viscosity is achieved, the end-point viscosity being that which will yield a desired viscous liquid copolymer after evaporation of the inert solvent or diluent.

An alternative method of preparing the styrenated oil involves heating a mixture of the drying oil and the vinyl or isopropenyl aromatic hydrocarbon and heating them until the monomer is copolymerized to the desired extent as determined by the measured viscosity. Where an active monomer, such as styrene, is used, from 5 to 40 percent of a less active monomer, such as an isopropenyl derivative should be included to retard polymerization.

In United States Patent 2,422,637, issued June 17, 1947, to Charles A. Thomas, there is described and claimed a resinous composition suitable for the preparation of varnishes by dissolution in drying oils. The resinous composition is made by condensing styrene oxide with phenol or a p-alkyl phenol, such as p-cresol, p-ethyl phenol, p-t-butylphenol, p-isopropylphenol or other p-alkyl phenol having up to six carbon atoms in the alkyl radical.

The styrene oxide-phenol condensation resin is prepared by heating the phenolic constituent and gradually adding a readily desired quantity of styrene oxide, for example from 50 to 200 percent by weight of the phenol, from one to four hours being required for the addition. The temperature required will be from 120° C. to about 225° C., precautions being taken to keep the reaction rate under control, a rapid but not vigorous reaction has been found to produce the best result. After the completion of the reaction further heating at reduced pressures will assist in the removal of unreacted monomers and water produced by the polymerization reaction.

It has been found that coating compositions useful in the preparation of clear, transparent surface films of unusual quality, may be prepared by dissolving in styrenated oils the resins prepared by condensing the aralkylene oxide phenolic resins. Useful coating compositions are prepared by utilizing one to ten parts by weight of either component, but which may in addition include from one to ten parts normal or bodied natural drying oils, such as linseed oil, soy oil, oiticia oil, dehydrated castor oil and chinawood oil.

The new varnishes may be dried in air, but accelerated drying may be induced by heating in a suitable air circulation oven, or in the open under infra red lamps. Accelerated room temperature drying may be achieved by the incorporation of conventional driers, for example the lead, cobalt, and manganese naphthenates, or similar heavy metal salts. If colored coatings are required conventional dyes and pigments may be added. The coating compositions may also be thinned by the incorporation of conventional diluents, such as turpentine, mineral spirits, coal tar naphtha, and xylene, the quantity being determined readily by the determination of the viscosity required for the particular method of application contemplated.

Further details of the preparation and use of the new varnishes are set forth with respect to the following specific example.

*Example*

An oil soluble phenolformaldehyde resin was prepared and dissolved in tung oil in the proportion of one hundred pounds for each 30 gallons of oil. In effecting the dissolution the mixture was heated at 500° F. for twenty minutes. The viscous solution so prepared was then mixed with an equal weight of a mixture of 80 percent mineral spirit and 20 percent xylene. A similar varnish was prepared in an identical manner except that a styrene oxide-phenol condensation resin was used in place of the phenolformaldehyde resin. Each of the two resin solutions were blended in various proportions with a styrenated drying oil containing 0.03 percent cobalt (as cobalt naphthenate) to facilitate drying. All surface coatings prepared from the various blended varnishes were dried tack-free within one hour and were set hard within twenty-four hours. The following table indicates the properties of the surface film so prepared.

| Styrenated Oils 0.03% Cobalt Per cent by Weight | Phenolformaldehyde Resin in Tung Oil Per cent by Weight of Resin | Styrene Oxide Phenol Resin in Tung Oil Per cent by Weight of Resin | Film Properties |
|---|---|---|---|
| 100 | 0 | 0 | Clear. |
| 90 | 10 | 0 | Opaque. |
| 79 | 21 | 0 | Do. |
| 65 | 35 | 0 | Do. |
| 55 | 45 | 0 | Do. |
| 50 | 50 | 0 | Do. |
| 33 | 67 | 0 | Do. |
| 0 | 100 | 0 | Clear. |
| 90 | 0 | 10 | Do. |
| 79 | 0 | 21 | Do. |
| 65 | 0 | 35 | Do. |
| 55 | 0 | 45 | Do. |
| 50 | 0 | 50 | Do. |
| 40 | 0 | 60 | Do. |

The above tabulation of data indicates that styrenated oil cannot be compounded with phenolformaldehyde resins in the manner conventional in the varnish industry. By using the styrene oxide-phenol condensation resins in place of phenolformaldehyde completely miscible varnishes, capable of producing clear, transparent films can be made by blending any proportion desired. By means of this invention the styrenated oil surface coatings can be improved with respect to solvent, alkali and water resistance without sacrificing the desirable clarity and transparency.

The invention is defined by the following claims.

I claim:

1. A coating composition comprising (A) a soluble copolymer of from 25 to 75 percent by weight of styrene and from 75 to 25 percent of a natural drying oil, (B) a natural drying oil and (C) a condensation product of phenol and from 50 to 200 percent, based on the phenol, of styrene oxide.

2. A coating composition comprising (A) one to ten parts by weight of a soluble copolymer of from 25 to 75 percent by weight of styrene and from 75 to 25 percent of a natural drying oil, (B) from one to ten parts of natural drying oil, and (C) from one to ten parts of a condensation resin of phenol and from 50 to 200 percent, based on the phenol, of styrene oxide.

3. A coating composition comprising (A) a soluble copolymer of 25 to 75 percent by weight of a compound selected from the group consisting of styrene, α-methylstyrene, vinylbiphenyl and isopropenylbiphenyl; and 75 to 25 percent of a natural drying oil, (B) a natural drying oil, and (C) a resin prepared by condensing styrene oxide and a phenol of the formula:

wherein R is a radical of the group consisting of hydrogen and alkyl radicals having up to 6 carbon atoms.

PAUL E. MARLING.

REFERENCES CITED

The following references are of record in the file of this patent:

UNITED STATES PATENTS

| Number | Name | Date |
|---|---|---|
| 2,322,837 | Ellis | June 29, 1943 |
| 2,382,213 | Dunlap | Aug. 14, 1945 |
| 2,392,710 | Wakeford et al. | Jan. 8, 1946 |
| 2,422,637 | Thomas | June 17, 1947 |
| 2,468,748 | Griess et al. | May 3, 1949 |

OTHER REFERENCES

Peterson, pgs. 596–600, Official Digest, August 1948.